April 7, 1970   C. A. LINDLEY   3,504,631
SELF-CONSUMING RAMJET VEHICLE
Filed Sept. 16, 1963   4 Sheets-Sheet 1
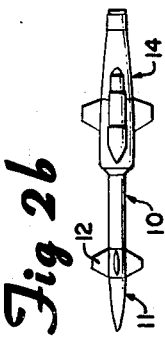
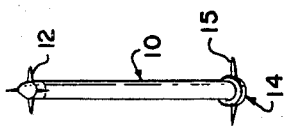
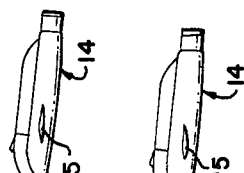
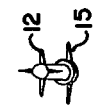
CHARLES A. LINDLEY
INVENTOR.
BY
ATTORNEY

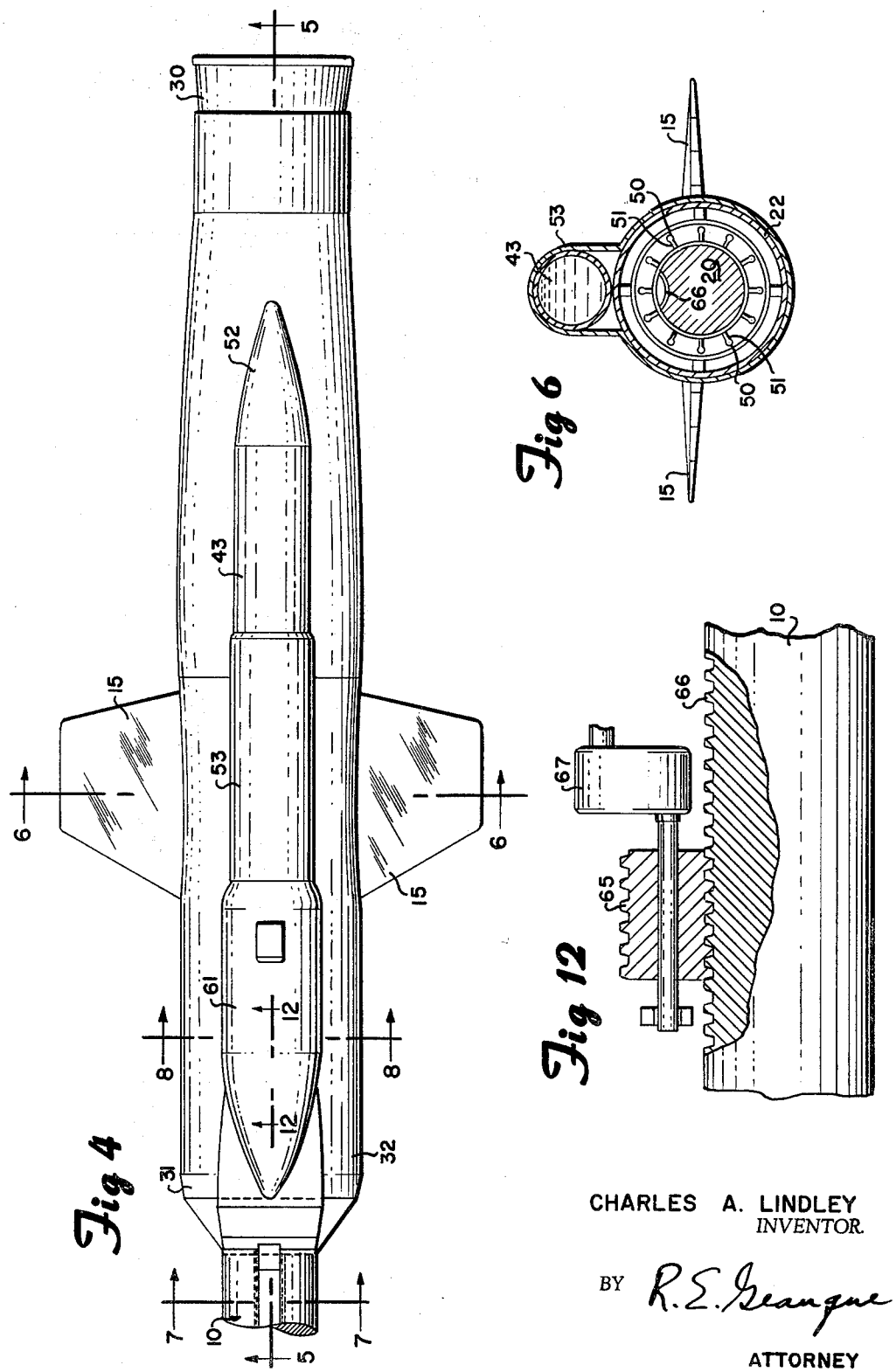

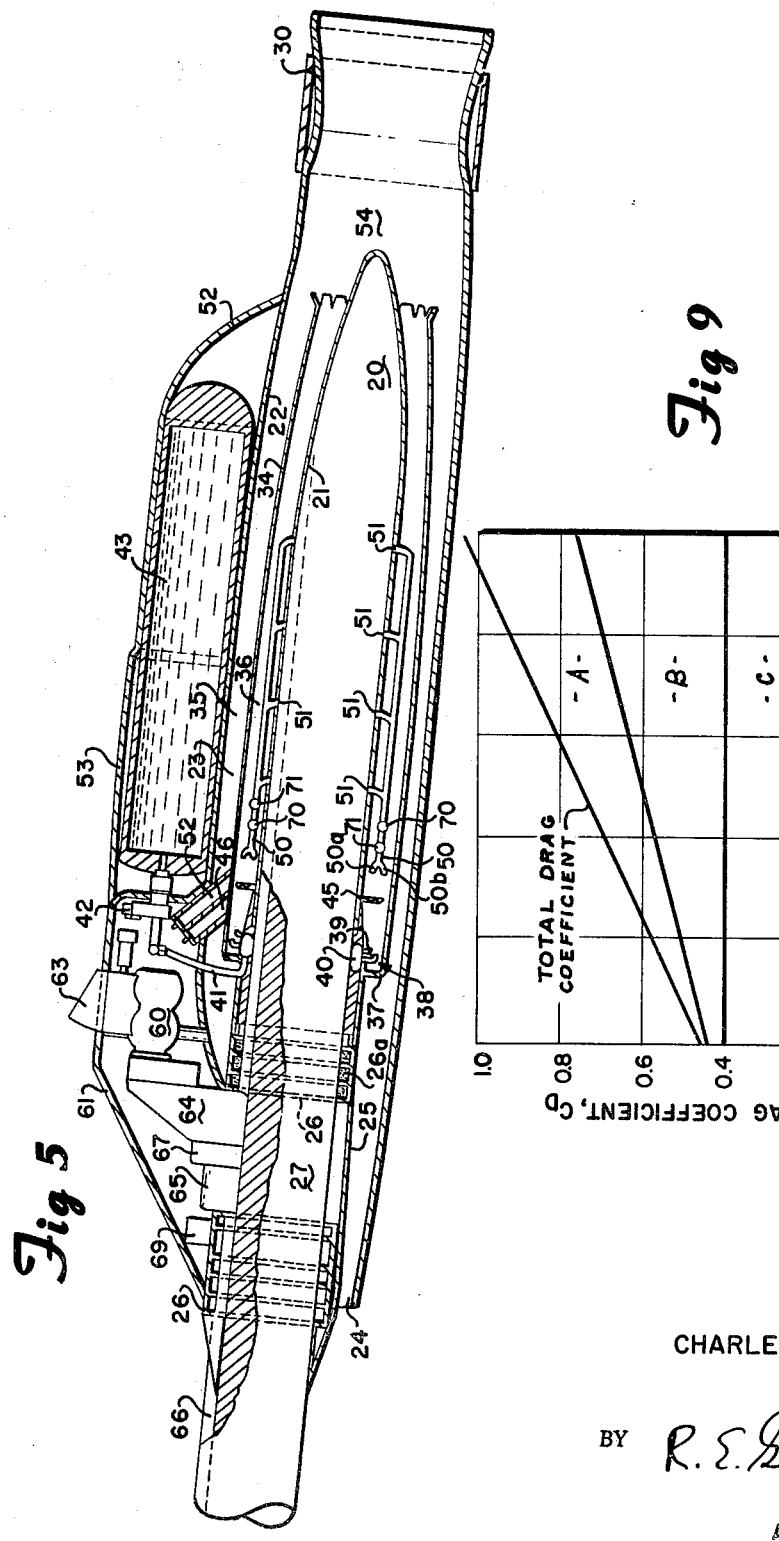

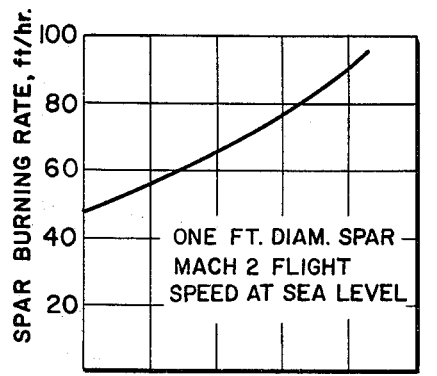
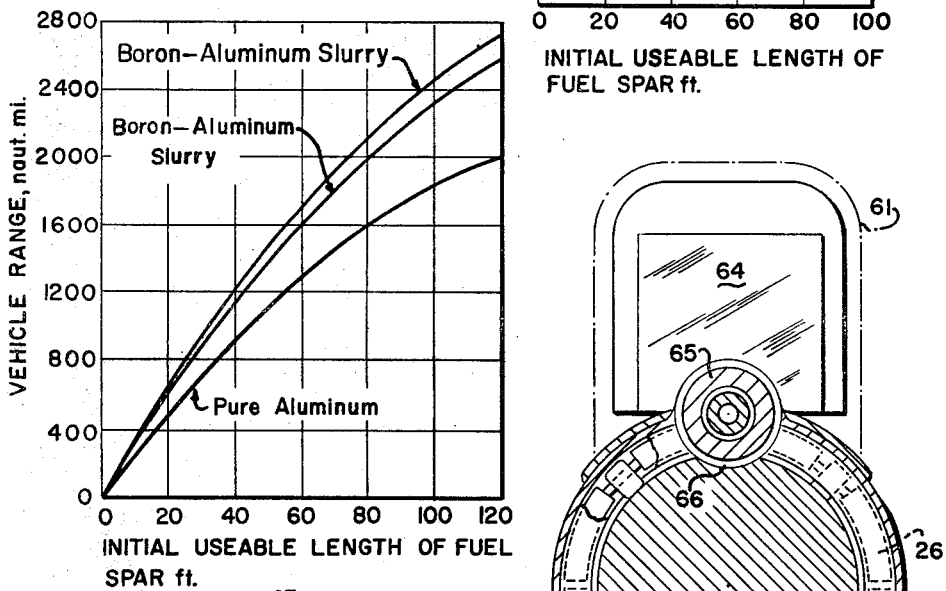
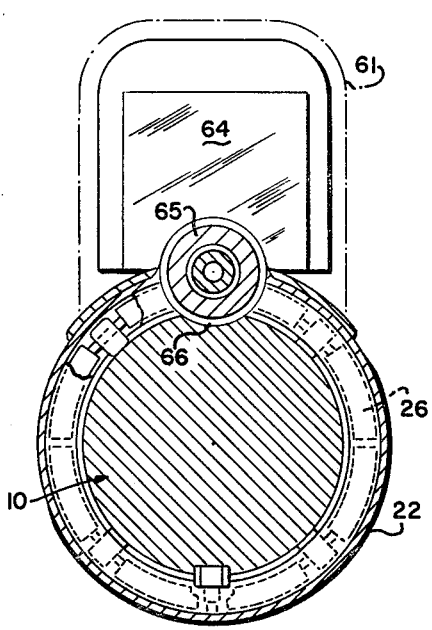
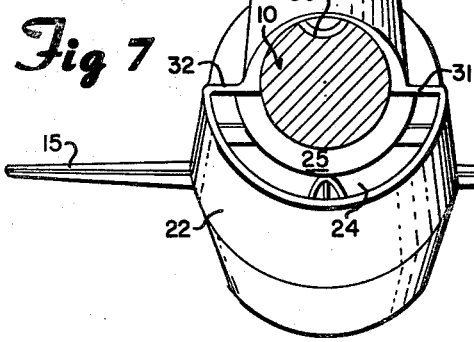

United States Patent Office 3,504,631
Patented Apr. 7, 1970

1

3,504,631
SELF-CONSUMING RAMJET VEHICLE
Charles Alexander Lindley, Woodland Hills, Calif., assignor to The Marquardt Corporation, Van Nuys, Calif., a corporation of California
Filed Sept. 16, 1963, Ser. No. 310,982
Int. Cl. F02k 7/10
U.S. Cl. 102—49.8                11 Claims This invention relates to a self-consuming ramjet vehicle, and more particularly to a vehicle consisting only of an engine section and a nose section connected by a solid fuel spar which is consumed by the engine. The fuel spar comprises the fuselage of the vehicle and consists of a metal pole of appropriate cross-secton cut to a length appropriate for the particular flight. The front end of the spar is inserted into the small nose section which may carry a warhead or payload, guidance instruments and control surfaces responsive to the guidance. The rear end of the spar fits into a socket in the engine section which may consist of the engine, vehicle speed controls, and a small fixed fin empennage to maintain stability. The socket into which the spar fits can be essentially a high-temperature melting pot heated by the flame in the ramjet burner itself. As the end of the spar melts in the pot, the molten fuel is drawn off by the fuel system and injected into the burner. The spar may be driven into the melting pot by the interplay of the thrust of the engine and the drag of the spar and vehicle nose or a positive drive may be used to force the spar into the melting pot.

The present invention has a reduction of drag in flight in the course of a mission so that increased range can be obtained. In addition to the usual invulnerability of a low-level supersonic vehicle, because of the difficultly of detecting and overtaking it, the vehicle of the present invention is almost invulnerable even when intercepted, because of the ruggedness of the fuselage structure and the fact that it contains no liquid fuel. Since the airframe is invulnerable to shrapnel and small arms fire and there is no fuel to leak out, the only vulnerable parts are the guidance, the engine and the payload which are relatively small in area. The fuel spar consists of a metal bar which can be easily stored since the bars are normally incombustible without the use of a melting pot and ramjet burner.

The ramjet burner of the engine produces a combustion flame to melt the fuel spar at a rate needed for consumption by the engine. The fuel must be capable of being melted at a temperature higher than that reached by aerodynamic heating and lower than the melting point of the melting pot material. With this limitation, aluminum, magnesium and their alloys with each other and with other materials can be used. In addition, the present invention contemplates a solid state slurry consisting of two materials: a low melting temperature matrix material which can be practically melted in the pot, and a material with an extremely high volumetric heating value, which can be reduced to powder form and stirred into the molten matrix material. The resulting metallic liquid-solid slurry is then cast into a fuel spar.

It is therefore an object of the present invention to provide a self-consuming ramjet vehicle in which the

2 total drag of the vehicle is reduced as the flight distance increases.

Another object of the present invention is to provide a flight vehicle having a body comprised of a solid fuel pole which is consumed during flight to continually reduce the drag of the vehicle, thereby resulting in a substantial increase in range.

Another object of the invention is to provide a fuel spar for a self-consuming ramjet vehicle which consists of a slurry of two metals cast in the form of a pole.

Another object of the invention is to provide a flight vehicle having a body comprised of a solid fuel having a high volumetric heating value.

A further object of the present invention is to provide a low-level flight vehicle which has no significant wings and flies on body lift alone.

Another object is to provide a flight vehicle whose airframe is invulnerable to anti-aircraft weapons, and contains no liquids that can leak or burn.

These and other objects of the invention not specifically set forth above will become readily apparent from the accompanying description and drawings, in which:

FIGURE 1A is a side elevational view of the vehicle of the present invention showing a full length fuel spar at the commencement of the flight;

FIGURE 1B is a side elevational view of the vehicle showing the short fuel spar at the end of the flight;

FIGURE 2A is a top plan view of the vehicle of the present invention showing a full length fuel spar;

FIGURE 2B is a top plan view showing the short fuel spar at the end of the flight;

FIGURE 3A is a front elevational view of the vehicle of the present invention taken along line 3A—3A of FIGURE 1A;

FIGURE 3B is a front elevational view of the vehicle taken along line 3B—3B of FIGURE 1B;

FIGURE 4 is an enlarged top plan view of the engine section of the vehicle of the present invention;

FIGURE 5 is a vertical section taken along line 5—5 of FIGURE 4 showing the tank for the starting fuel and the air motor for driving the fuel spar;

FIGURE 6 is a transverse, vertical section taken along line 6—6 of FIGURE 5 showing the burner tubes for the molten metallic fuel;

FIGURE 7 is a transverse, vertical section taken along line 7—7 of FIGURE 4 showing the inlet for the engine;

FIGURE 8 is a transverse, vertical section taken along line 8—8 of FIGURE 4 showing the gear drive for the fuel spar;

FIGURE 9 is an illustration of the variation in drag coefficient during vehicle flight;

FIGURE 10 is an illustration of change in fuel spar buring rate as the spar is consumed;

FIGURE 11 is a comparison of vehicle range vs. initial spar length for several different fuels; and FIGURE 12 is a partial sectional view along line 12—12 of FIGURE 4 showing the driving gear for the fuel spar.

An embodiment of the invention chosen for purposes of illustration is shown generally in FIGURES 1–3. The fuel supply, which also serves as the fuselage, consists of a meltable, slender spar 10 of metallic material, such as aluminum, with a length dependent upon the mission range. A small nose section 11 is rigidly attached to the forward end of the spar and contains the payload, which can be in the form of a bomb, and also contains the guidance (not shown) for activating four control surfaces 12 of the canard type. The control surfaces are in cruciform arrangement around the nose section and each surface is pivoted about an axis 13 extending radially outward from the nose section and through the control surface intermediate its ends. An engine section 14 fits on the rear end of the fuel spar and consists of a ramjet engine, vehicle speed controls and two fixed stability surfaces 15. During flight, the nose surfaces 12 determine the altitude and flight direction of the vehicle while the fixed rear surfaces 15 provide for stability of the vehicle. A standard guidance (not shown) for the control surfaces 12 can be utilized in which the output of a radio altimeter and radar in the nose section is continually compared with a previously prepared radar map in order to continually schedule the altitude and direction of the vehicle.

The rear end portion 20 of the fuel spar is shaped to closely fit into a fuel melting pot 21 which can be shaped like a parabolic body of revolution. The outer shell 22 of the engine defines an air passage 23 located around the melting pot 21. The air passage 23 connects with an engine inlet opening 24 which is arranged semiannularly about the fuel spar. The inlet can be of fixed conical design and has an inner surface 25 which connects with the forward end of melting pot 21. The spaced, structural supports 26 for surface 25 also receive and support portion 27 of fuel spar 10 which is just forward of portion 20 located in melting pot 21. Some of the supports 26 contain sealing material 26a to prevent forward leakage of molten fuel and the aft end of shell 22 contains an exit nozzle 30.

The outer surfaces 31 and 32 aft of the inlet 24 gradually transform air passage 23 into an annular section surrounding the melting pot 21. An annular shroud 34 divides air passage 23 into an outer portion 35 and an inner portion 36 and the shroud has air flow openings at its forward end 37 for connecting the inner portion 36 with the air passage 23. A starter burner 38 is located at the forward end 37 of shroud 34 and comprises a plurality of burner pipes 39 connected with a fuel manifold 40 and spaced around inner portion 36. Manifold 40 is connected by passage 41 through a valve 42 to a supply tank 43 containing any suitable starting fuel, such as kerosene or JP-4, under pressure. The pipes 39 are directed rearwardly toward flame holder 45 and a hot flame igniter 46 of well-known construction ignites the fuel discharged from burner pipes 39.

The burning of the fuel from tank 43 with the air entering the inner portion 36 heats up the melting pot 21 along its length and causes the metallic fuel, such as aluminum, to melt at its outer surface. The entire vehicle can be launched either by dropping it with or without a rocket booster from a high-flying airplane, or by boosting it from the ground, using a rocket booster. A plurality of liquid metal fuel pipes 50 are connected into the melting pot 21 by a plurality of branches 51 spaced along the length of each pipe 50 in order to draw off the molten metal fuel at the intersurface between the fuel spar portion 20 and the melting pot. The hot liquid fuel is discharged into the inner portion 36 of the air passage 23 where it is initially ignited by a hot flame igniter 52 and the continued burning of the metal fuel provides sufficient heat about the exterior of the melting pot to continually melt additional fuel from the surface of the fuel spar.

The fuel spar is continually forced rearwardly into the melting pot 21 at a constant pressure, in a manner presently to be described, so that the molten fuel will be continually forced through pipes 50 for combustion within the inner passage portion 36. The hot gases of combustion will progressively melt the fuel spar and as the portion 20 of the spar melts away, the spar moves inwardly into pot 21 to maintain a thin liquid layer around the end of the spar. Combustion will only take place inside the shroud 34, thus resulting in a higher flame temperature due to the greater fuel equivalence ratio obtained by using only a portion of the air flow for combustion. A reasonable flame temperature of the molten fuel is about 4,000° R. which provides for the proper heat transfer rates through the melting pot, both by radiation and convection. After the initial melting of the spar by the fuel in tank 43, the flame in burner 38 will be reduced while the second flare 52 is used to ignite the spar fuel in burner pipes 50. The fuel tank 43 is located on top of the shell 22 and is partially covered by streamlined cowling sections 52 and 53 which can be detachable in any suitable manner to permit the fuel tank to be ejected after the spar fuel has been ignited. The hot gases flowing over the melting pot 21 exit from shroud 34 into space 54 where the gases join the air leaving outer passage portion 35 and the mixture then exhausts through the exit nozzle to produce the vehicle thrust.

The feed system for moving the fuel spar into the melting pot comprises an air motor 60 mounted within cowling section 61 above shell 22. The air motor inlet passage 62 receives air from air passage 23 forward of shroud 34 and exhausts to atmosphere through discharge opening 63. A gear reduction box 64 is connected with the air motor and drives a gear 65 which engages a tooth rack 66 which has been cut into the top of the fuel spar, thus forcing it into the melting pot. This forcing action generates a pressure in the melting pot, and it is this pressure which is used to feed the molten metal fuel to the burner tubes 50. The turbine output can be regulated through the use of a slip clutch 67 of standard construction interposed between the gear 65 and reduction mechanism 64, or by a pressure tap control in burner tubes 50 (not shown) to maintain the fuel feed pressure at a constant value. Before leaving through passage 63, the expanded air could be passed through sealing material 26a for cooling same.

A valve 70 in each burner pipe 50 is controlled by a flight speed sensor 69 of well-known construction in order to control the flow of the molten metallic fuel and thereby control the thrust output in order to maintain a scheduled flight speed. The end of each burner tube 50 is divided into branch tubes 50a and 50b so that the point of combustion of the fuel with respect to the melting pot can be varied to control the rate of melting of the fuel spar. A valve 71 in each pipe 50 downstream of valve 70 directs the molten fuel into branch tube 50b to reduce the melting rate or into branch tube 50a to increase the melting rate, and thereby match the melting rate with the fuel flow rate. Valves 71 can be controlled in such a manner that when the valves 70 call for a high thrust level and fuel flow, the fuel will be directed through branches 50a closest to the melting pot 21 to maintain a higher melting rate. At a lower thrust level, the fuel will be directed through branch passages 50b to reduce the melting rate. The geometry of both the inlet 24 and the exit 30 can be fixed in order to maintain the simplest possible structure, and such fixed inlet and exit is satisfactory since the vehicle operates primarily as a cruise vehicle at a constant Mach number. Even when flown at several different Mach numbers, the fixed geometry would not impair the performance to such a degree as to require variable geometry components with their added weight and complexities.

Since the vehicle preferably cruises at low altitudes and relies upon body lift alone, the range and performance is dependent upon separation of the crossflow component of the airstream. Separated air flow around the spar can be insured by use of spoilers, such as very small strips of solid fuel which protrude on both sides of the spar along the entire length. The total drag of the vehicle is given by the sum of the profile, friction and induced drag of the various components. The variation in the total drag coefficient with the usable length of a foot diameter aluminum fuel spar is shown in FIGURE 9 for flight speed of Mach 2 at sea level, and it is apparent that the induced drag and skin friction designated by areas A and B, respectively, drop off sharply with reduction in spar length while the drag of the fixed sections designated by the area C, remains constant. When the vehicle operates in a cruise mode at constant velocity, the drag coefficient defines the required thrust coefficient and, hence, the specific fuel consumption. Since the drag reduces as the fuel spar is consumed, the thrust and specific fuel consumption and, hence, the burning rate of the fuel spar, will also vary with fuel spar length as illustrated in FIGURE 10 for a one-foot diameter spar. Thus, the vehicle range will vary in a non-linear manner with the initial length of the fuel spar.

The fuel spar must be of a solid material to support the nose and engine sections and should have a high volumetric heating value for low altitude flight. Thus, solid metals provide desirable fuel spars because of their strength and high densities. In general, the fuel spar material must have a melting point which is sufficiently high to withstand aerodynamic heating and must have structural strength to withstand gust loads and other violent aerodynamic forces encountered during flight. Also, the melting temperature must be low enough so that the fuel can be easily melted in the engine without damage to structural materials of the engine. From these considerations, aluminum and magnesium are the most acceptable metals and aluminum has the higher heating value of the two. While beryllium and boron are better fuels, the temperature limitation imposed by the structural materials of the engine precludes the use of boron, and makes the use of beryllium doubtful unless combined with metals of lower melting temperature. For instance, a higher performance fuel can be obtained from solid state slurries produced by mixing boron or beryllium powders into a molten material, such as aluminum or magnesium, and then casting the slurry into a fuel spar. In the cast form, the solid powders that were mixed in the molten metal will be prevented from settling out indefinitely. When the spar is melted, the all-metal, liquid-solid slurry, which is as well mixed as when it was cast, will be regained. In FIGURE 11, the performance of pure aluminum is compared with boron-aluminum slurry (53.6% by weight of boron powder) and with boron-magnesium slurry (64.2% by weight of boron powder). While the boron-aluminum slurry has the better heating value, the boron-magnesium slurry is easier to melt, presents fewer combustion problems, and gives greater range at a given vehicle weight.

In addition to the various fuels, the fuel spar can vary in diameter from a few inches to several feet and the spar can have other shapes than circular, such as a flattened ellipse. In the larger vehicles, the weight per unit lifting surface is so high that the angle of attack required at high altitudes results in increased induced drag which cancels any benefits of high altitude flight. An elliptical cross-section of the spar can result in slightly greater range because of increase in lifting surface. Initial spar length and circumference can be varied in accordance with the desired range and lengths of 200 feet and above can be used. Various other modifications of the invention are contemplated by those skilled in the art without departing from the spirit and scope of the invention as hereinafter defined by the appended claims.

What is claimed is:

1. A ramjet vehicle comprising:
a nose section having flight control surfaces thereon;
an engine section separated from said nose section and comprising an air passage connected between an air inlet and an exhaust nozzle and means for injecting fuel into the incoming air in said passage for combustion therewith;
a solid fuel spar rigidly connected at one end with said nose section and having its other end inserted into said engine section for continually melting by combustion within the engine section to provide a supply of molten fuel for said fuel injection means; and
means for driving said spar into said engine section as said other end of said spar is melted.

2. A ramjet vehicle comprising:
a nose section having flight control surfaces thereon;
an engine section separated from said nose section and comprising an air passage connected between an air inlet and an exhaust nozzle and means for injecting fuel into the incoming air in said passage for combustion therewith;
a solid fuel spar extending between said nose section and said engine section;
means in said engine section for continually melting one end of said spar to provide a molten fuel supply for said fuel injecting means; and
means for driving said solid spar into said engine section for providing additional fuel for said engine as said one end melts.

3. A ramjet vehicle as defined in claim 2 wherein said melting means comprises a melting pot receiving said one end of said spar and located within said air passage adjacent said fuel injecting means for utilizing the fuel combustion to continually melt said one end.

4. A ramjet vehicle as defined in claim 2 wherein said fuel spar has a rack of teeth extending the length of said spar, said driving means comprising a gear engaging said rack and rotatable to drive said spar into said engine section.

5. A ramjet vehicle as defined in claim 2 wherein said fuel spar is constructed of a solid material selected from the group consisting of aluminum, magnesium and a slurry of either with boron or beryllium.

6. A ramjet vehicle as defined in claim 3 wherein said fuel injection means comprises burner means connecting with the molten surface of the spar adjacent in the interior of said melting pot and conducting the molten spar material into said incoming air for combustion therewith at a location opposite the exterior surface of said melting pot.

7. A ramjet vehicle as defined in claim 2 having an auxiliary burner means located adjacent said melting means and connected with an auxiliary fuel supply to initiate the melting of said spar to initially provide fuel for said fuel injection means.

8. A ramjet vehicle as defined in claim 2 wherein said driving means includes means for maintaining a constant driving pressure on said fuel spar to provide molten fuel to said fuel injection means at constant pressure, and valve means for regulating fuel flow through said fuel injection means.

9. A ramjet vehicle as defined in claim 8 wherein said fuel injecting means comprises a pair of terminal fuel pipe branches with one terminal branch located closer to said melting means than the other terminal branch, and regulating means for controlling the flow of molten fuel to both said terminal branches to regulate the rate of melting of said one end of said fuel spar.

10. A ramjet vehicle as defined in claim 3 wherein said fuel spar passes into said melting pot through said air passage, said air inlet being arranged semiannularly about said fuel spar.

11. A self-consuming ramjet vehicle comprising:
a nose section having flight control surfaces thereon;
an engine section located aft of said nose section and separated therefrom;
said engine section comprising an air passage connected between an air inlet and an exhaust nozzle and means for injecting fuel into said air passage for combustion with the incoming air;
a solid fuel spar extending between said nose section and said engine section;
a melting pot located in said engine section for receiving and continually melting the aft end of said fuel spar to provide a fuel supply for said fuel injecting means;

means for driving said solid spar into said melting pot for providing additional fuel for said engine as said one end melts, the drag coefficient of said vehicle being reduced as the fuel spar is consumed and reduced in length; and an auxiliary combustion means located adjacent said melting pot and connected with an auxiliary fuel supply to melt said spar.

References Cited

UNITED STATES PATENTS

| 2,926,613 | 3/1960 | Fox | 102—98 |
|---|---|---|---|
| 3,049,883 | 8/1962 | Sloan. | |
| 3,127,739 | 4/1964 | Miller. | |

VERLIN R. PENDEGRASS, Primary Examiner

U.S. Cl. X.R.

60—251, 261 270